United States Patent
Gonzalez et al.

(10) Patent No.: US 12,124,835 B2
(45) Date of Patent: Oct. 22, 2024

(54) COMPUTER SYSTEM AND METHOD FOR FACILITATING REAL-TIME DETERMINATION OF A PROCESS COMPLETION LIKELIHOOD

(71) Applicant: THE BANK OF NEW YORK MELLON, New York, NY (US)

(72) Inventors: Francisco Javier Vicente Gonzalez, London (GB); Abhishek Singh, Maharashtra (IN); Jonathan Owen, Manchester (GB)

(73) Assignee: THE BANK OF NEW YORK MELLON, New York, NY (US)

( * ) Notice: Subject to any disclaimer, the term of this patent is extended or adjusted under 35 U.S.C. 154(b) by 35 days.

(21) Appl. No.: 17/979,353

(22) Filed: Nov. 2, 2022

(65) Prior Publication Data
US 2023/0350662 A1   Nov. 2, 2023

(30) Foreign Application Priority Data
Apr. 28, 2022 (IN) .............................. 202241025073

(51) Int. Cl.
G06F 8/65 (2018.01)
G06F 11/34 (2006.01)

(52) U.S. Cl.
CPC ............ *G06F 8/65* (2013.01); *G06F 11/3495* (2013.01)

(58) Field of Classification Search
CPC .............................. G06F 8/65; G06F 11/3495
USPC ................................. 717/168–174; 706/22–45
See application file for complete search history.

(56) References Cited

U.S. PATENT DOCUMENTS

| | | | |
|---|---|---|---|
| 10,628,748 B2 * | 4/2020 | Yu ......................... | G06F 18/214 |
| 11,063,840 B1 | 7/2021 | Li et al. | |
| 11,206,179 B1 * | 12/2021 | Rathore .............. | H04L 63/0807 |
| 11,252,113 B1 * | 2/2022 | Orkin ...................... | G06F 3/167 |
| 11,258,674 B1 | 2/2022 | Li et al. | |
| 11,373,257 B1 * | 6/2022 | Guo ........................ | G06N 20/00 |

(Continued)

OTHER PUBLICATIONS

Ventura et al, Expand your Training Limits! Generating Training Data for ML-based Data Management:, ACM, pp. 1865-1878 (Year : 2021).*

(Continued)

*Primary Examiner* — Anil Khatri
(74) *Attorney, Agent, or Firm* — Pillsbury Winthrop Shaw Pittman, LLP

(57) ABSTRACT

Provided are systems, methods, and programming for facilitating real-time determination of a process completion likelihood. In some embodiments, data including an update to a system, the update occurring at a first time, wherein updates to the system are permitted until an expiration time may be obtained, a set of fixed descriptors of the system may be retrieved and/or received, and a set of status updates describing the system at prior times may be obtained. Each status update of the set of one or more status updates includes at least (i) an update to the first system and (ii) a time that the respective status update occurred. Based on the data, the fixed descriptors, and the status updates, using a trained machine learning model, a failure/success score indicating a likelihood that, at the expiration time, the system satisfies a threshold condition may be computed and stored in memory.

21 Claims, 9 Drawing Sheets

(56) References Cited

U.S. PATENT DOCUMENTS

| | | | | |
|---|---|---|---|---|
| 11,645,522 B2* | 5/2023 | Krishnan | ............... | G06N 3/08 705/37 |
| 11,664,126 B2* | 5/2023 | Baron | ............... | G06N 5/01 706/45 |
| 11,710,029 B2* | 7/2023 | Ooi | ............... | G06N 3/08 706/25 |
| 11,715,042 B1* | 8/2023 | Liu | ............... | G06N 3/006 705/26.1 |
| 11,726,769 B2* | 8/2023 | McMahan | ............... | G06N 3/084 717/171 |
| 11,727,263 B2* | 8/2023 | Lee | ............... | G06F 40/44 706/25 |
| 11,748,759 B1* | 9/2023 | Sardari | ............... | G06Q 30/0631 705/44 |
| 11,763,195 B2* | 9/2023 | Huerta | ............... | G06N 20/00 706/45 |
| 11,763,945 B2* | 9/2023 | Maroo | ............... | G06F 18/254 706/45 |
| 11,775,887 B2* | 10/2023 | Luse | ............... | G06N 20/20 706/45 |
| 11,960,514 B1* | 4/2024 | Taylert | ............... | G06F 16/3329 |
| 2021/0035693 A1 | 2/2021 | Mohammad et al. | | |

OTHER PUBLICATIONS

Pahl et al., "Supporting Active Database Learning and Training through Interactive Multimedia", ACM, pp. 27-31 (Year: 2004).*

Zhu et al, "Learning Tree-based Deep Model for Recommender Systems", ACM, pp. 1079-1088 (Year: 2018).*

Qiubo et al, "Research on Code Plagiarism Detection Model Based on Random Forest and Gradient Boosting Decision Tree", ACM, pp. 1-6 (Year: 2019).*

Silvia et al, "A Machine Learning Model to Classify the Feature Model Maintainability", ACM pp. 1-11 (Year: 2021).*

Vartak et al, "MODELDB: A System for Machine Learning Model Management", ACM, pp. 1-3 (Year: 2016).*

International Search Report and Written Opinion of the International Searching Authority dated Jul. 11, 2023, issued in corresponding International Application No. PCT/US2023/019326.

Pierre Geurts et al., "Extremely Randomized Trees", Mach Learn (2006) 63: 3-42.

* cited by examiner

COMPUTER SYSTEM AND METHOD FOR FACILITATING REAL-TIME DETERMINATION OF A PROCESS COMPLETION LIKELIHOOD

CROSS-REFERENCE TO RELATED APPLICATIONS

This application claims priority to India Patent Application No. 202241025073, filed Apr. 28, 2022, the subject matter of which is incorporated herein by reference in entirety.

FIELD OF THE INVENTION

Embodiments relate to real-time likelihood determination of a process completion. In particular, embodiments relate to systems and methods for facilitating real-time determination of a process completion likelihood.

BACKGROUND

Given a certain set of fixed information, a model can be used to predict the likelihood of a given event occurring. However, real-time information may further be obtained that can alter the predicted likelihood. Currently, such models are unable to properly alter the predicted likelihood based on real-time information. These and other drawbacks exist.

SUMMARY

The following is a non-exhaustive listing of some aspects of the present techniques. These and other aspects are described in the following disclosure.

Some aspects relate to a method for facilitating real-time likelihood determination of a process completion. The method may include: obtaining first data comprising a first update to a first system, the first update occurring at a first time, wherein updates to the first system are permitted until an expiration time; at least one of retrieving or receiving a set of fixed descriptors of the first system; obtaining a set of one or more status updates describing the first system at one or more times prior to the first time, wherein each status update of the set of one or more status updates includes at least (i) an update to the first system and (ii) a time that the respective status update occurred; computing, based on the first data, the set of fixed descriptors, and the set of one or more status updates, using a trained machine learning model, a first failure/success score indicating a likelihood that, at the expiration time, the first system satisfies a threshold condition; and storing the first failure/success score in memory in association with the first data, the set of fixed descriptors, and the set of one or more status updates.

Some aspects include a computing system, including memory storing computer program instructions and one or more processors configured to execute the computer program instructions to effectuate the above-mentioned method.

Some aspects include a non-transitory computer-readable medium storing computer program instructions that, when executed by one or more processors, effectuate the above-mentioned method.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
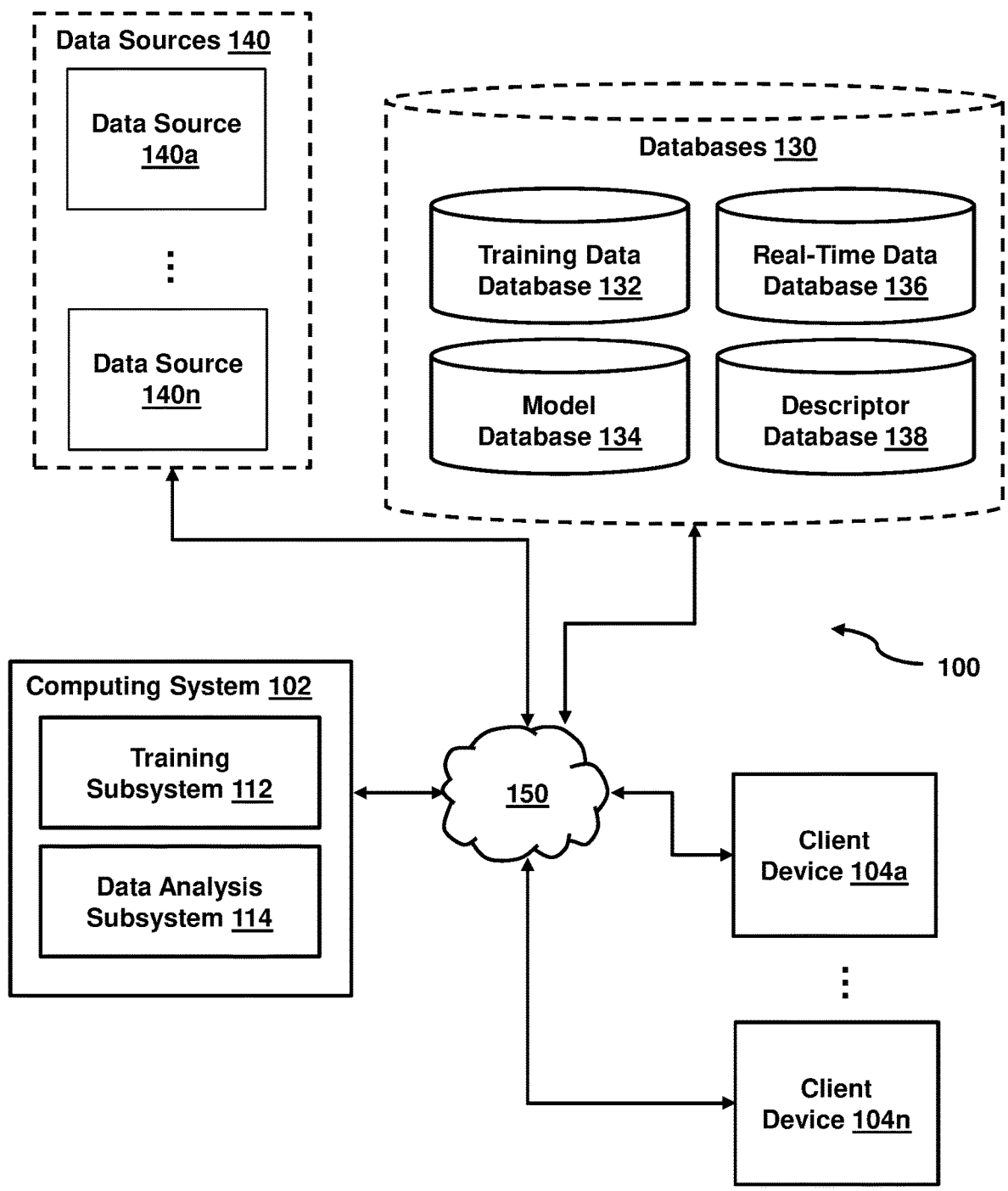
FIG. 1 is a system diagram that illustrates an example system for performing real-time updates to a likelihood determination, in accordance with one or more embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of predictive modeling. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Predictive modeling may be used to determine a likelihood that an action, event, result, outcome, or other scenario will occur at or by (e.g., before) a particular time. Some embodiments include inputs being provided to a predictive model, which in turn may be configured to output a result. The result may be a score, e.g., a probability or other indication, that, based on the inputs, indicates how likely the model estimates that the action, event, result, outcome, or other scenario will occur at or by the particular time; a classification of one or more result types, e.g., based on the inputs, one or more of A, B, or C is likely to occur; or other outputs, or combinations thereof. Some embodiments may include predictive models that are configured to continually update a predicted outcome as new data becomes available. Some embodiments include the predicted outcome representing a likelihood that, at or by the end of a predefined amount of time, based on fixed inputs, e.g., static information, and real-time, e.g., streaming, inputs, a particular result occurs.

Generally, predictive models make a prediction based on a fixed set of inputs. Continually updating the predictions based on newly received data can be computationally expensive and/or exhaustive due to the number of variables the model may take. Furthermore, running the model to obtain the predicted results can be time and computationally consuming. A model may be run based on a particular set of conditions being present, such as a certain amount and/or type of data being obtained, an input being received from a client device, a time expiring, or other criteria being satisfied.

Described herein are various embodiments that train and employ a predictive model configured to predict an outcome, e.g., at any given point in time, based on a set of fixed inputs and continue to update the prediction as new data is received. The predictions may be based on a predefined time with which a system performs a process that produces the true outcome. As a non-limiting example, if a system performs transaction processing, the transactions may proceed until an expiry time when settlement occurs. Thus, the predictions may be based on an amount of time left until the settlement occurs. In some embodiments, the amount of time may be predefined and immutable. The new data that is received may include updates to the system performing the process, updates to the process, or other information received. The updates may be received in real-time from a data source. Data that is received in "real-time" may also be referred to interchangeably as "streaming data." Furthermore, as defined herein, the term "real-time" may refer to a process that occurs within such a brief amount of time, e.g., less than 1 second, less than 1 millisecond, less than 1 nanosecond, etc., that the delay between the action physically occurring and the action being conveyed, e.g., via visual mechanisms, audible mechanisms, textual mechanisms, haptic mechanisms, or any other input mechanism being applied, to a client device (as well as, for example, a user operating the client device) is negligible.

In various embodiments, by continually updating the likelihood of a particular outcome happening as new data is available, issues may be identified and remedied in advance. The issues may impact a variety of different technological and practical areas. For example, manufacturing issues may be detected and corrected before major issues arise, thereby improving logistics chains. As another example, compliance issues may be detected and corrected before security becomes compromised, thereby improving network security and computing reliability. As still yet another example, readmittance to hospitals or other healthcare locations may be reduced by continually monitoring ongoing care provided to a patient, detecting potential health issues that are occurring with the patient, and providing the patient with appropriate therapeutic and/or medical interventions. The aforementioned benefits and improvements to various verticals should be viewed as exemplary and should not be construed as limiting the scope of the present disclosure.

FIG. 1 is a diagram that illustrates an example system 100 for performing real-time updates to a likelihood determination, in accordance with one or more embodiments. As shown in FIG. 1, system 100 may include computing system 102, client devices 104a-104n (collectively referred to as "client devices 104" and individually referred to as "client device 104," interchangeably), data sources 140 (which may include data sources 140a-140n), databases 130 (which may include training data database 132, model database 134, real-time data database 136, descriptor database 138, and/or other databases), or other components. Computing system 102 may include training subsystem 112, data analysis subsystem 114, and/or other components. Each client device 104 may include any type of mobile terminal, fixed terminal, or other device(s). By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computing system 102, those operations may, in some embodiments, be performed by other components of computing system 102 or other components of system 100. As an example, while one or more operations are described herein as being performed by components of computing system 102, those operations may, in some embodiments, be performed by components of computing device 104. It should also be noted that, although some embodiments are described herein with respect to machine learning models, other prediction models (e.g., statistical models and/or other analytics models) may be used in lieu of or in addition to machine learning models in other embodiments (e.g., a statistical model replacing a machine learning model and a non-statistical model replacing a non-machine-learning model in one or more embodiments).

Data sources 140a-140n may be configured to receive a continuous or intermittent flow of updated data from a corresponding real-time application or system executing one or more processes. For example, a real-time application may generate and output updated data, which may be received by data sources 140. As another example, the real-time application may generate and output the updated application data, which may be received by another data feed.

In some embodiments, data sources 140a-140n may be configured to receive updated data for a predetermined amount of time, which may be defined by an initialization/inception time and an expiration time/expiry. For example, the updated data may be provided to data sources 140 within a data stream. In some cases, the updated data may not be stored persistently by data sources 140. In some cases, the updated data may be buffered to local cache by a computing system associated with the data feed (e.g., computing system 102), which may be periodically purged to receive new updated application data from the real-time application.

Some example data sources include a health data source configured to receive health information (such as blood pressures, oxygen levels, pulse rates, etc., measured at various times); a financial settlement source configured to receive financial information (such a value of an asset at a particular time before settlement); a system performance source configured to receive performance information relating to a system configured to perform one or more processes (such as a manufacturing system configured to perform a particular action or sequence of actions); a security source configured to receive compliance information relating to network security; a data compliance source configured to receive inputs for validating that a document or other information complies with one or more requirements (such as ensuring that one or more data fields have values, as well as, or alternatively, checking that a value attributed to a data field is a valid input); or other sources.

In some embodiments, training subsystem 112 may be configured to train a prediction model, such as a machine learning model, to predict an outcome of a process. Some embodiments include the prediction model predicting a likelihood that a system configured to perform a process will obtain a particular result (such as whether the system will successfully perform the process) at a particular time, by a particular time, and/or within a particular time-period, etc. Some embodiments further include training subsystem 112 being configured to generate, transform, or otherwise produce training data optimized for training a model to quickly, e.g., in real-time, identify a probability that a process results in a particular outcome. In this way, if an issue is detected early enough, the issue may be remediated, ideally before causing any negative outcomes (such as component failure, security breaches, health issues, etc.) or, at minimum, mitigating the situation.

Figure 2:
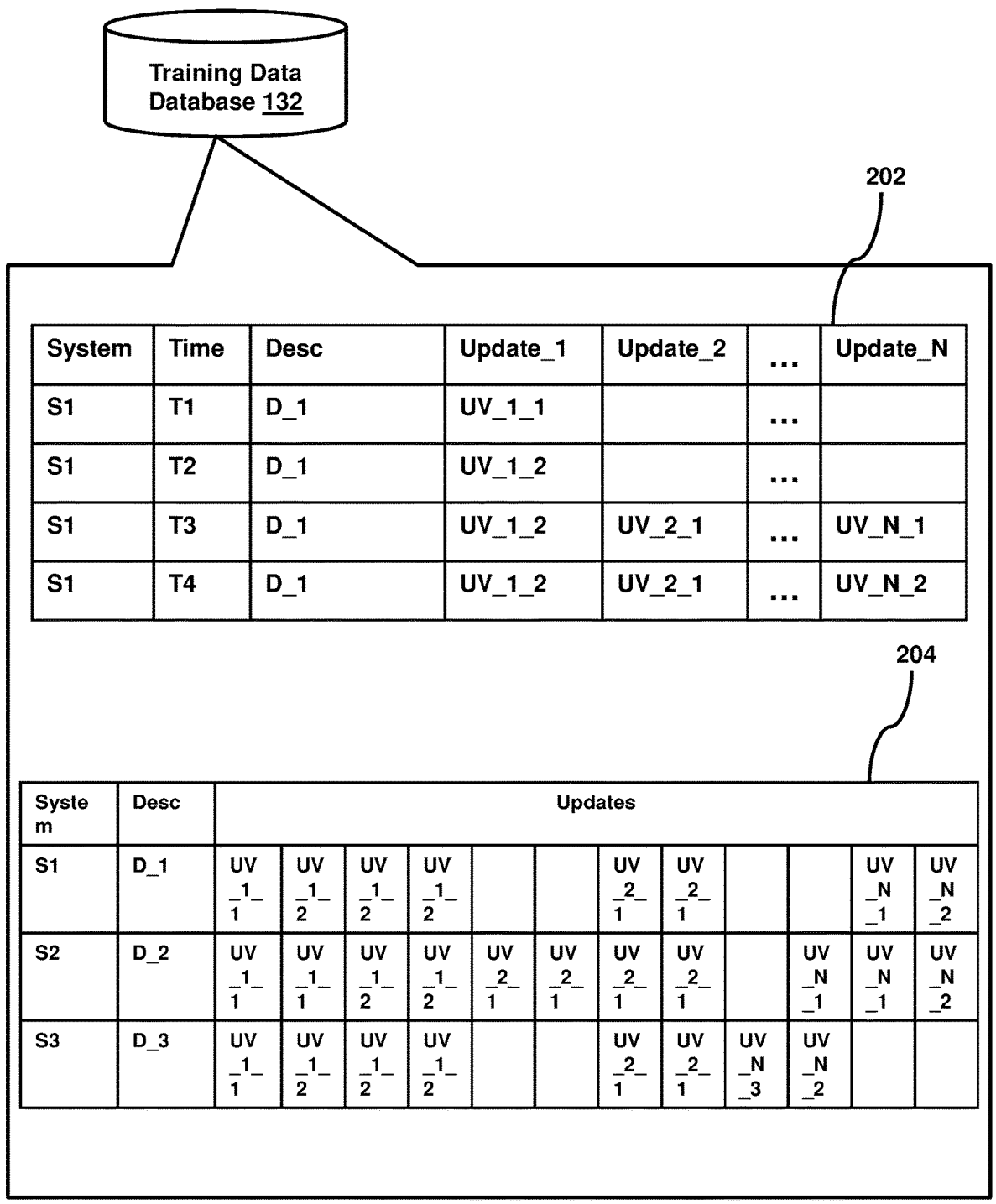
FIG. 2 is a diagram that illustrates example training data used to train a model for performing real-time updates to a likelihood determination, in accordance with one or more embodiments.

As an example, with reference to FIG. 2, training data database 132 may be configured to store one or more data structures, such as data structure 202 and data structure 204. The number of data structures, and the organization of those data structures, is merely for simplicity and should not be construed as limiting the scope of the disclosure. In some embodiments, data structure 202 may be referred to as an initial data structure, and data structure 204 may be referred to as a transformed data structure. Data structure 202 may be data in its raw format, or in a format after some initial pre-processing steps. Data structure 204 may include the data from data structure 202 (as well as additional data structures) transformed into a format capable of facilitating improved training of a machine learning model, as well as having faster run-time execution. However, this is not to imply that data structures having a format the same or similar to data structure 202 would produce models having worse accuracy than models trained using data structures being the same or similar to data structure 204; rather, some embodiments may have a faster training and execution using data structures such as data structure 204.

Data structure 202 may include rows as a set of data fields populated with real-time values obtain from a system (such as a system S1, performing a process P1) for a particular time. Each row may represent a time that a particular update to the system occurred, and the value associated with the data field processed for that update. For example, at a first time T1, system S1 may perform process P1 that causes a first value "UV_1_1" to be obtained for a first data field "Update_1." At a second time T2, system S1 may perform, or continue to perform, process P1 (or another process) that causes a second value "UV_1_2" to be obtained for first data field "Update_1." In this example, based on the performance of process P1 at times T1 and T2, the value for a particular metric (e.g., Update_1) may change from a first value to a second value. At time T3, system S1 may perform, of continue to perform, process P1 (or another process), which may cause the second value "UV_1_2" to be obtained for the first data field. Additionally, a first value "UV_2_1" may be obtained for a second data field "Update_2" (which may refer to another metric), and a first value "UV_N_1" may be obtained for an N-th data field "Update_N" (which may refer to another metric). The number of data fields "N" represents a number of metrics that may be computed to describe one or more processes performed by a particular system. For example, N may be one or more, two or more, 5 or more, 10 or more, or other values. At a fourth time T4, system S1 may perform, or continue to perform, process P1 (or another process), which may cause the second value "UV_1_2" to be obtained for the first data field, the first value "UV_2_1" to obtained for the second data field, and a second value "UV_N_2" to obtained for the N-th data field.

Data structure 202 may include a set of descriptors, such as descriptors D_1, which describe one or more fixed values describing one or more parameters of the system. Some embodiments include the descriptors being fixed during a duration of a process performed by a system. For example, descriptors D1 may be remain constant, e.g., D_1 from an initial time (such as t=0) through times T1-T4 until an end time. Some example descriptors include, but are not limited to, which is not to imply that other lists are limiting, an initial value of a metric defining one or more aspects of a process performed by a system, a quantity of items considered by the process, an initial/intermediate/final entity associated with the process, or other information. In some embodiments, different systems, as well as, or alternatively, different processes performed by a system or systems, may have different descriptors associated with them. For example, as seen with reference to data structure 204, descriptors D_1 are stored in association with system S1, whereas descriptors D_2 and D_3 are respectively stored in association with systems S2 and S3. The process(es) performed by systems S1, S2, S3 may be the same or different. As an illustrative example, if systems S1, S2, S3 performed a transaction, descriptors D1 may indicate a broker (e.g., entity A) and a clearer (e.g., entity B), whereas systems S2 and S3 may have different brokers and clearers (for instance, system S2 may have entity E and entity A as broker-clearer, respectively, while system S3 may have entity C and entity D as broker-clearer, respectively).

In some embodiments, the amount of time between updates may not be uniform. For example, an amount of time between a first update to system S1 (or a process performed by system S1) at time T1 and a second update to system S1 (or a process performed by system S1) at time T2 may be different than the amount of time between the second update at time T2 and a third update to system S1 (or a process performed by system S1) at time T3.

As described herein, a "system" is referred to as a computing device configured to perform one or more processes having a predefined end time, where new data updating a likelihood of a particular outcome being obtained is capable of being received up until the end time. The new data may be used to compute a real-time prediction based on the new data, any previously received data, e.g., data associated with a prior update occurring after the processes began but before the end time, and fixed information, e.g., descriptors of the system, and/or any combination(s) thereof. Some example processes performed by a corresponding system include compliance verification, security checks, transaction settlements, health monitoring, or others. Updates to the system, or processes performed thereby, may include, for example, new data received based on some new measured/computed value. For example, for health monitoring, if one of the processes performed by the system is obtaining blood pressure levels of a patient at various time intervals, then the new data received may include new blood pressure measurements. As another example, for transaction settlements, if one of the processes performed by the system is obtaining updates regarding foreign asset control sanctions, then at each update, a value may be provided that indicates whether sanctions are authorized.

Figure 3:
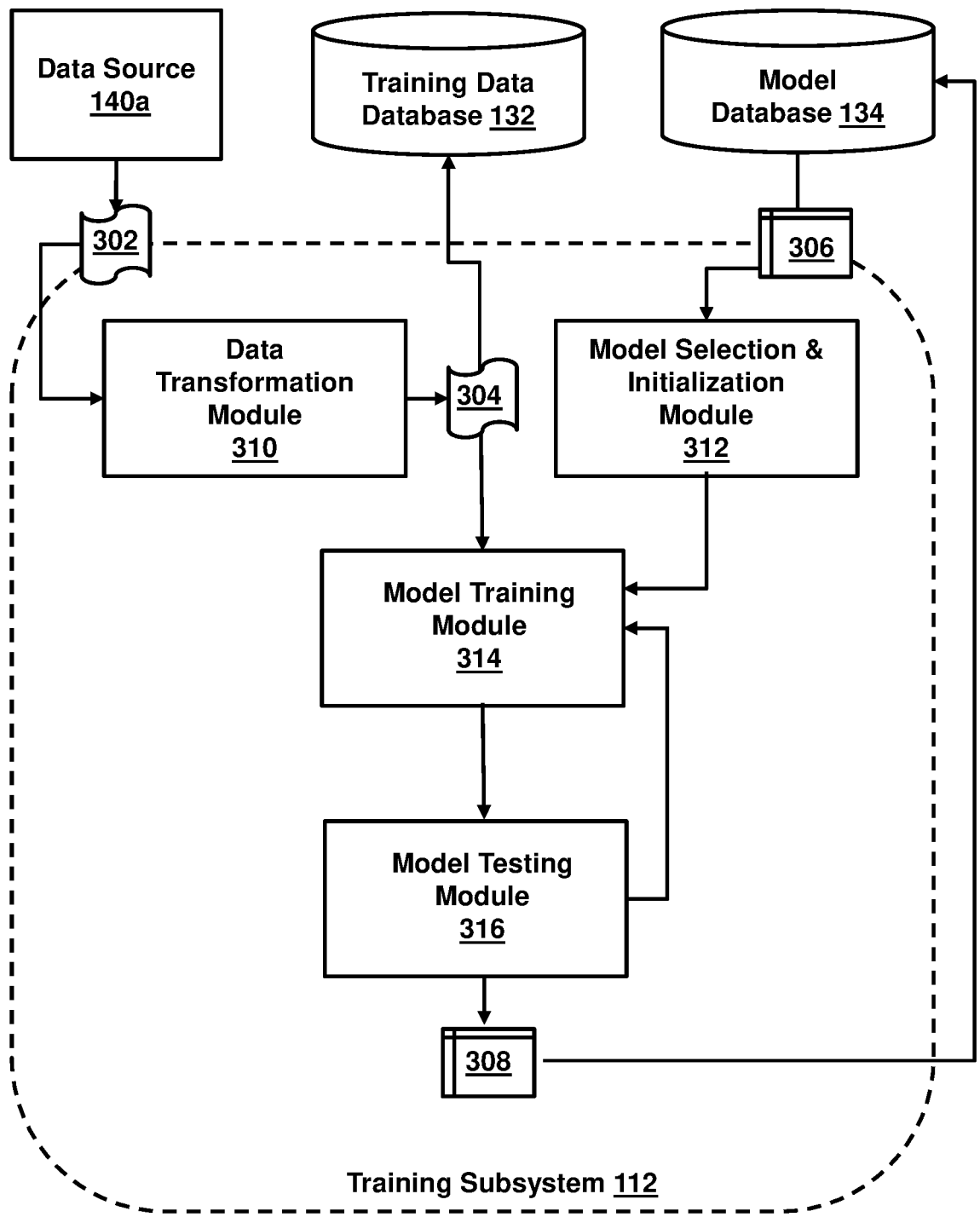
FIG. 3 is a diagram that illustrates an example training subsystem, in accordance with one or more embodiments.

In some embodiments, training subsystem 112 may be configured to transform raw data, or data having one or more preprocessing steps performed thereto, into data that is optimized for training a model to make real-time predictions, such as whether a system (or a process performed by the system) will fail or succeed. As an example, with reference to FIG. 3, training subsystem 112 may include a data transformation module 310 configured to transform data 302 obtained from a data source 140a and having a first format, e.g., data structure 202, into data 304 having a second format, e.g., data structure 204, optimized for training a machine learning model to perform real-time predictions based on status updates of a system. As described herein, a "module" refers to a packaged functional hardware unit designed for use with other components (e.g., portions of an integrated circuit, components of system 100) and/or a part of a computer program (e.g., stored on a computer-readable medium) that performs a particular function or related functions.

Data transformation module 310 may convert data 302, e.g., data structure 202, into data 304, e.g., data structure 204. In some embodiments, the transformation may include structuring the data included within data structure 202 such that each status update is organized in order of update type, and within that ordering, the status updates are temporally aligned. As an example, consider the following status updates for the first data field (Update_1) to system S1 at times T1-T4, as seen in data structure 202: {(T1, UV_1_1), (T2, UV_1_2), (T3, UV_1_2), (T4, UV_1_2)}. Data transformation module 310 may be configured to structure each of these status updates as a portion of a row entry associated with system S1. For example, as seen from data structure 204, the first four entries to the "Updates" data fields for system S1 are UV_1_1, UV_1_2, UV_1_2, and UV_1_2. Furthermore, consider the following status updates for the second data field (Update_2) to system S1 at times T1-T4, as seen in data structure 202: {(T1, Null), (T2, Null), (T3, UV_2_1), (T4, UV_2_1)}. Data transformation module 310 may be configured to structure each of these status updates as a portion of the row entry associated with system S1, in particular, these updates are appended to an end of the updates associated with the first data field (Update_1). For example, as seen from data structure 204, after entries UV_1_1, UV_1_2, UV_1_2, UV_1_2 are the following entries Null, Null, UV_2_1, UV_2_1 (noting that "Null" refers to an empty or Null value for a particular datum). Data transformation module 310 may perform similar transformations to the data in data structure 202, as well as other systems' data (e.g., data structures similar to data structure 202 but which correspond to other systems or processes) so as to structure the data in order of update and temporally. Data 304 produced by data transformation model 310 (such as data organized into data structure 204) may be stored in training data database 132. In some embodiments, the data stored in training data database 132 may include a timestamp or other metadata indicating when the update occurred, the type of update that occurred, a remaining time until the end time of the processes performed by the system, or other information.

Returning to FIG. 3, training subsystem 112 may further include a model selection and initialization module 312, a model training module 314, a model testing module 316, or other modules. Model selection and initialization module 312 may be configured to select a machine learning model 306 from model database 134 to be trained, re-trained, tested, or perform other training/testing aspects. A given machine learning model (or set of models) may be selected from model database 134 based on a particular process, task, or objective sought to be obtained by the model. For example, a convolutional neural network (CNN) may be selected from model database 134 for processes related to computer vision. The various machine learning models stored by model database 134, from which training subsystem 112 may select from, include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Extra Random Forest, Tree ensemble models, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions, etc.).

In some embodiments, machine learning model 306 may be a model to be trained, such as using training data stored in training data database 132. In such scenarios, model selection and initialization module 312 may be configured to initialize one or more hyperparameters of machine learning model 306. If machine learning model 306 is a model to be re-trained, model selection and initialization module 312 may not initialize the hyperparameters or may initialize only a subset of hyperparameters. The initialization criteria may be stored in model database 134, provided by client device 104, or learned based on prior model training. In some embodiments, multiple machine learning models 306 may be selected and trained, e.g., in parallel or in succession, to achieve different results.

As mentioned above, the trained machine learning model may estimate a likelihood that a particular update to a system (or a process performed by the system) results in a successful outcome or a failed outcome. What defines "successful" outcomes and "failures" may depend on the use case, the domain of the application, prior results, user settings, or other factors. As an example, "failures" may be classified as a particular metric producing a score that is less than a threshold score.

Some embodiments include machine learning models that are trained to make real-time decisions on whether an outcome will be successful. To run in real-time, the machine learning model needs to be accurate and fast. An inaccurate model and/or slow model will result in users not employing the model.

Purely for illustrative purposes, the foregoing describes a particular genre of machine learning model that can be used for the real-time failure/success of certain processes, such as those having a defined end time. Decision Tree, Random Forest, and Extra Tree classifiers refer to a type of machine learning model that performs classifications. These classifiers, as well as some others, can be referred to as tree ensemble models. One of their main benefits is the speed with which they can perform classifications.

Decision Tree Classifier: Decision trees refer to cascading nodes and leaves, each having a particular likelihood of occurring. For example, a simple binary decision tree classifier may define that, for a given feature, if a value of that feature is greater than some value, then the model is to proceed to one leaf node while if the model is not greater than the value, the model is to proceed to the other (or another) leaf node. Decision trees refer to a very rudimentary form of machine learning ensemble technique, which can often be used with bagging and boosting. Decision trees may be joined together to improve the accuracy of the model, however the overall accuracy may still relatively similar to that of a single-level decision tree.

To train the decision tree or trees, all of the data may be available for use. For example, all of the data included within data structure 204 may be available for selection when training the decision trees. To determine how (or if) a node is to be split, all available features may be searched to find an optimal split.

Random Forest Classifier: Differing from the Decision Tree model described above, the Random Forest model randomly samples the training data (e.g., the data included within data structure 204) to create bootstrapped data. In particular, the size of the bootstrapped data set is the same size as the initial training data set. Furthermore, to determine an optimal split for a given node, a subset of randomly selected features may be searched, where the subset has a size equal to the square root of the number of features.

A key difference between the aforementioned decision tree model and the Random Forest model is the random sampling of the training data, which is used to generate the bootstrapped data set, which is used to train the model. The "forest" in Random Forest model refers to the fact that a number of trees are made use various bootstrapped datasets. The random forest model may search each selected feature for an optimal split for that feature. While individually each tree (or ensemble of trees) has its own error, the combined power of the Random Forest classifiers is that the combination of all of the tree ensembles make a fast and accurate model.

Extra Tree Classifier: The extra tree classifier, which is also referred to interchangeably as Extremely Randomized Trees, and various permutations thereof, is another tree ensemble classifier that is similar to the Random Forest classifier described above with "extra"—hence the name. For the Extra Tree classifier, all of the data will be used to form decision trees (for example, each decision stump may be built using all of the data). A best split may be determined by searching a subset of randomly selected features having a size equal to the square root of the total number of features. Furthermore, the split of each selected feature may be chosen at random.

The Extra Trees model may consider the standard batch-mode supervised learning problem and focus on learning problems characterized by (possibly a large number of) numerical input variables and one single (e.g., categorical or numerical) target variable.

The term "attribute" denotes a particular input variable used in a supervised learning problem. The candidate attributes denote all input variables that are available for a given problem. The term "output" refers to the target variable that defines the supervised learning problem. When the output is categorical, it is referred to as a classification problem and when the output is numerical, it is referred to as a regression problem. The term "learning sample" denotes the observations used to build a model, and the term test sample refers to the observations used to compute the model's accuracy (error-rate, or mean square-error). N refers to the size, e.g., number of features, of the learning sample, i.e., its number of observations; and n refers to the number of candidate attributes, i.e., the dimensionality of the input space.

The Extra-Trees algorithm builds an ensemble of unpruned decision or regression trees according to the classical top-down procedure. Its two main differences with other tree-based ensemble methods are that nodes are split by choosing cut-points fully at random and using the whole learning sample (rather than a bootstrap replica) to grow the trees. Pseudocode describing the Extra Trees model is described below in Table 1.

TABLE 1

Extra-Trees splitting algorithm (for numerical attributes)

Split_a_node(S)
Input: the local learning subset S corresponding to the node we want to split
Output: a split $[a < a_c]$ or nothing
    If Stop_split(S) is TRUE then return nothing.
    Otherwise select K attributes $\{a_1, \ldots, a_K\}$ among all non constant (in S) candidate attributes;
    Draw K splits $\{s_1, \ldots, s_K\}$, where $s_i$ = Pick_a_random_split (S, $a_i$), $\forall_i = 1, \ldots, K$;
    Return a split $(s_*, S) = MAX_i - 1, \ldots, K$ Score$(s_i, S)$.
Pick_a_random_split(S, a)
Input: a subset S and an attribute a
Output: a split
    Let $a_{max}^s$ and $a_{min}^s$ denote the maximal and minimal value of a in S;
    Draw a random cut-point $a_c$ uniformly in $[a_{min}^s, a_{max}^s]$;

TABLE 1-continued

Extra-Trees splitting algorithm (for numerical attributes)

Return the split [a < $a_c$].
Stop_split(S)
Input: a subset (S)
Output: a boolean
　　If |S| < $n_{min}$, then return TRUE;
　　If all attributes are constant in S, then return TRUE;
　　If the output is constant in S, then return TRUE;
　　Otherwise, return FALSE The Extra Trees model's splitting procedure for numerical attributes is given in Table 1. In particular, two parameters are defined: K, the number of attributes randomly selected at each node and $n_{min}$, the minimum sample size for splitting a node. This procedure is used several times with the (full) original learning sample to generate an ensemble model (denoted by M, the number of trees of this ensemble). The predictions of the trees are aggregated to yield the final prediction, by majority vote in classification problems and arithmetic average in regression problems (however other techniques can also be used). From the bias-variance point of view, the rationale behind the Extra Trees model is that the explicit randomization of the cut-point and attribute combined with ensemble averaging should be able to reduce variance more strongly than the weaker randomization schemes used by other classifiers.

The usage of the full original learning sample rather than bootstrap replicas is motivated in order to minimize bias. From the computational point of view, the complexity of the tree growing procedure is, assuming balanced trees, on the order of N log N with respect to a learning sample.

Given the simplicity of the node splitting procedure, it is expected that the constant factor will be much smaller than in other ensemble-based methods which locally optimize cut-points. The parameters K, $n_{min}$, and M have different effects: K determines the strength of the attribute selection process, $n_{min}$ determines the strength of averaging output noise, and M determines the strength of the variance reduction of the ensemble model aggregation. These parameters could be adapted to the problem specifics in a manual or an automatic way (e.g., by cross-validation). However, to maximize the computational advantages and autonomy of the Extra Tree model, default settings may be used.

To specify the value of the main parameter K, the notation ETK can be used, where K is replaced by 'd' to say that default settings are used, by '*' to denote the best results obtained over the range of possible values of K, and by 'cv' if K is adjusted by cross-validation.

Tree based algorithms are considered to be one of the best and mostly used supervised learning methods. Tree based algorithms empower predictive models with high accuracy, stability, and ease of interpretation.

Figure 4:
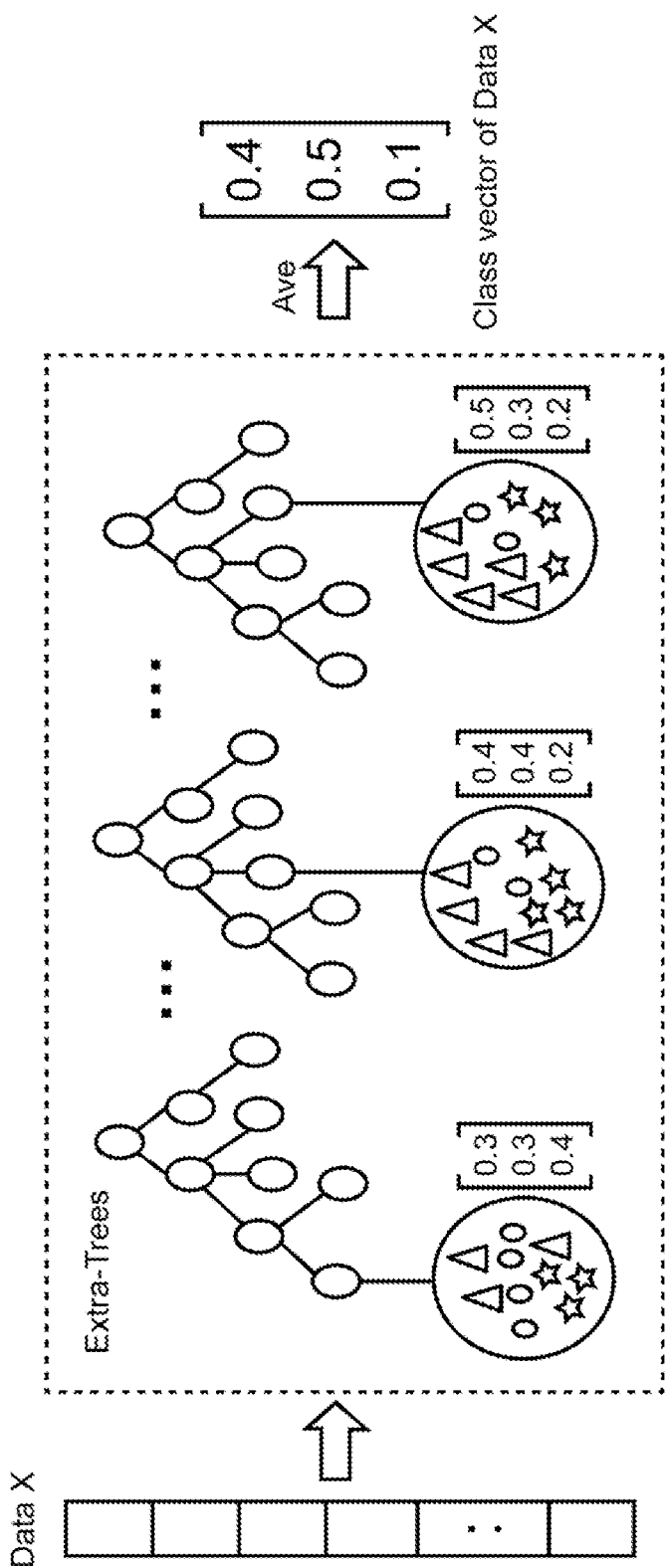
FIG. 4 is a diagram that illustrates an example tree ensemble model, in accordance with one or more embodiments.

Extremely Randomized Trees (or Extra-Trees) is an ensemble learning method. An example of the decision trees of the Extra Trees model may be seen, for example, with reference to FIG. 4. For example, in FIG. 4, different trees may be built based on an initial data (e.g., data included within data structure 204). After training and testing (described below), the model may be used to analyze new data by classifying the new data using the various trees, then applying a voting or regressive approach to classify the outcomes of each tree and obtain a predicted outcome. The method creates extra trees randomly in sub-samples of datasets to improve the predictivity of the model. By this approach, the method reduces the variance. The method averages the outputs from the decision trees. This method is similar to random forest. There are two differences between the two methods:

Random forest uses bootstrap replicas, that is to say, it subsamples the input data with replacement, whereas Extra Trees use the whole original sample.

Random Forest chooses the optimum split while Extra Trees chooses it randomly. However, once the split points are selected, the two algorithms choose the best one between all the subset of features. Therefore, Extra Trees adds randomization but still has optimization.

Both Extra Trees and Random Forest are both programmed to optimize the end result. Extra-Trees does better with many noisy features.

As a non-limiting example, an Extra Trees classifier may be built for trade settlement fail analysis. For instance, if a trade settles by a particular end time (such as a Market Deadline on the Contractual Settlement Date), the trade may be classified as a successful settlement (Pass). If a trade settles after the end time or never settles, the trade may be classified as a failed settlement (Fail). In doing so, a ground truth may be formed which is the labeled data employed to train the model. For every trade, all available information needed to classify the result is available, along with the end time and when the settlement occurred (if at all). A binary variable may be attributed to each settlement to indicate success or failure (for example, a binary variable: 1=Pass, 0=Fail). Persons of ordinary skill in the art will recognize that other classification schemes may be used instead, and not all results need to have binary outcomes (e.g., a probability of passing or failing may also be used).

Returning to FIG. 3, model training module 314 may be configured to execute training of the selected machine learning model, e.g., model 306. Some embodiments include model 306 being an Extra Trees machine learning model. As mentioned above, for a model such as the Extra Tree model, model training module 314 may be configured to obtain training data, such as data 304, from training data database 132, as well as the selected model, e.g., model 306, and train the model using one or more optimization techniques. More details regarding training an Extra Trees model may be found in "Extremely Randomized Trees," Geurts et al., Machine Learning (2006) 63:3-42; DOI 10.1007/s10994-006-6226-1, the contents of which are hereby incorporated by reference in their entirety.

Some embodiments include testing the trained model using model testing module 316. Module testing module 316 may determine how accurate the trained model using testing data, which is also referred to herein interchangeably as validation data. In some embodiments, training data 304 may be segmented prior to the training process beginning. The segmentation may form a portion of the training data which will be used to train the model and another portion to test the trained model. Model testing module 316 may apply the test data to the trained machine learning model and compute an accuracy score indicating how accurately the trained model classified new data, e.g., the test data. If it is determined that the model is not performing accurately, such as the accuracy score being less than a threshold accuracy score (e.g., less than 95% accurate, less than 90% accurate, less than 80% accurate, less than 51% accurate, etc.), then model testing module 316 may instruct model training module 314 to retrain the model. This may include accessing new/additional training/testing data, and performing new rounds of training/testing until the accuracy of the trained model satisfies an accuracy condition (e.g., the accuracy score of the trained model on testing data being greater than or equal to a threshold accuracy score, greater than or equal to 51% accuracy, greater than or equal to 75% accuracy, greater than or equal to 85% accuracy, greater than or equal to 90% accuracy, greater than or equal to 95% accuracy, etc.).

Model testing module 316 may further be configured to store the trained machine learning model, e.g., trained machine learning model 308, in model database 134. For example, based on a determination that the accuracy score of the trained model satisfies the threshold accuracy condition, model testing module 316 may store machine learning model 308 in model database 134. Trained machine learning model 308 may be stored in association with an indication of a time the training occurred, the training/testing data used to train/test the model, or other indications. Some embodiments include deploying trained machine learning model 308 to a platform such that it may receive real-time data, such as from data source 104a, and estimate a likelihood that a process performed by a system will result in a certain outcome.

Figure 5:
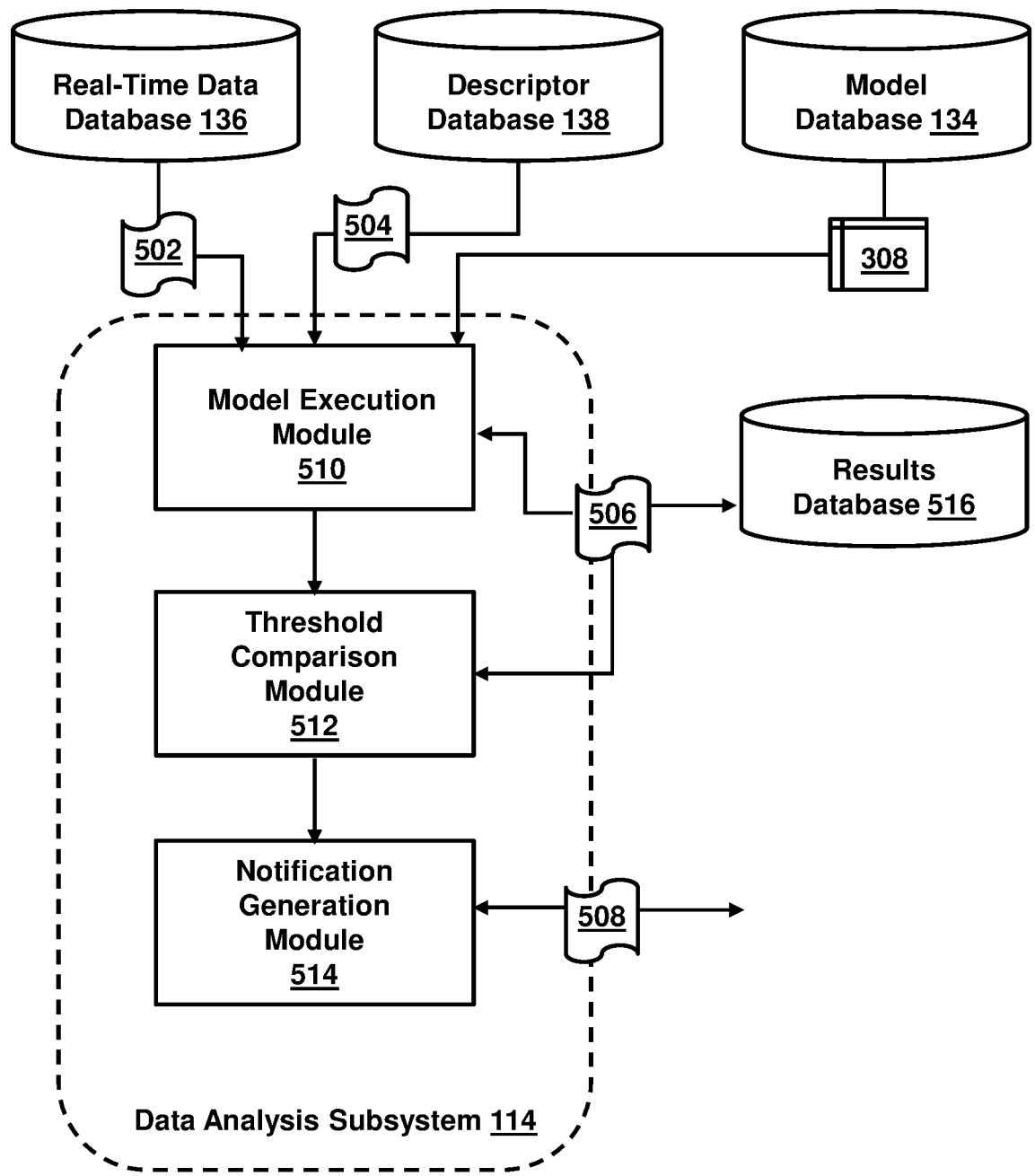
FIG. 5 is a diagram that illustrates an example data analysis subsystem, in accordance with one or more embodiments.

In some embodiments, data analysis subsystem 114 may be configured to analyze new data, determine an outcome of the analysis, determine whether one or more conditions are satisfied, and generate notifications based on the determinations. As an example, with reference to FIG. 5, data analysis subsystem 114 may include a model execution module 510, a threshold comparison module 512, a notification generation module 514, or other components. As mentioned above, a "module" refers to a packaged functional hardware unit designed for use with other components (e.g., portions of an integrated circuit, components of system 100) and/or a part of a computer program (stored on a computer-readable medium) that performs a particular function or related functions.

Model execution module 510 may be configured to execute a trained machine learning model, such as trained machine learning model 308. Some embodiments include data, such as real-time data 502, being input to trained machine learning model 308, which in turn may output a result 506. In some embodiments, real-time data 502 may be stored, persistently or temporarily, in real-time database 136. A data source, such as data sources 140a-140n, may stream real-time data to computing system 102 and/or to databases 130, for storage, analysis, and the like. While real-time data 502 is shown to be obtained from real-time data database 136, alternatively real-time data 502 may be obtained from a data source, e.g., data source 140a. Some embodiments include real-time data 502 being received at various time intervals, which may or may not be consistent. Furthermore, some embodiments include real-time data 502 being received from a predefined start time until a predefined end time. Some embodiments include updates to a system executing a process for which the trained machine learning model is predicting an outcome being received and results output and stored to results database 516 in real-time. By "in real-time," the time between the model outputting result 506 and result 506 being received at results database 516 being less than a perceivable time delay (under the groundwork that network latency or other computing issues are not an issue).

In some embodiments, model execution module 510 may provide, as input, real-time data 502 and descriptors 504 to trained machine learning model 308. Descriptors 504 may be stored in descriptor database 138. Descriptors refer to information that is fixed for input to the trained machine learning model. For example, if the model is trained to determine a likelihood of hospital readmittance based on each new glucose measurement taken, the descriptors provided as input to the model may include the patient's age, height, blood type, and the like. Each system, and the processes performed thereby, may have a particular set of descriptors. Some descriptors may overlap between systems and processes. In some embodiments, one or more fixed descriptors may change, e.g., due to changes to the underlying system, due to new information being provided, etc. In such embodiments, the system may therefore be configured to execute a retraining process in which the trained machine learning model is retrained to account for any changes (e.g., additions, removals, etc.) to the fixed descriptors.

In some embodiments, results 506 may be a value indicating a likelihood that, based on a current update, any previous updates, the fixed set of descriptors, and an amount of time until expiry, a system executing a process obtains a particular outcome. Using the aforementioned model trained to determine a likelihood of hospital readmittance based on each new glucose measurement taken, the model may output a score indicating how likely it is that a particular patient will be readmitted to the hospital based on the provided model inputs. As an example, if the model is an Extra Tree model, trees including nodes split based on training data may each be provided with a new status update (such as a newly measured glucose level). The outcome of each tree may then be used to generate a result, such as by using a voting scheme. Some embodiments include results being a numerical value, such as, for example, a probability.

Some embodiments include results 506 being provided to threshold comparison module 512. Threshold comparison module 512 may be configured to determine whether a computed result 506 satisfies a threshold condition. Satisfaction of a threshold condition may cause one or more actions to be taken. As an example, if the patient's glucose level drops to a particular value, which causes the probability of that patient's readmittance to the hospital increasing past a threshold probability, one or more actions may be taken to help counteract the change in probability (such as providing a therapeutic intervention, contacting a family member to check on the patient, etc.). Some embodiments include the threshold condition being satisfied if a score produced by the trained machine learning model is greater than or equal to a threshold score, or less than or equal to a same or different threshold score. The threshold score may be predefined, however in some embodiments the threshold may be adjusted. Some cases include the threshold score being learned based on a number of false positives predicted.

In some embodiments, determination that the threshold condition has been satisfied may cause a flag to be appended to result 506. For example, the flag may be a binary 1 or 0 indicating that the threshold condition was satisfied (e.g., flag set to 1) or not satisfied (e.g., flag set to 0). Additionally, or alternatively, the satisfaction of the threshold condition may cause threshold comparison module 512 to cause notification generation module 514 to generate a notification 308. Some embodiments include notification 508 being provided to a parameter adjustment subsystem, an alert and monitoring subsystem, or other components of system 100. Notification generation module 514 may generate a particular type of notification based on the type of trained model, e.g., trained machine learning model 508, that was used to predict result 506. The notification may cause one or more parameters of a system (and/or a process performed thereon) for which the prediction corresponds to be adjusted in an effort to counteract the changed score. The notification may also, or alternatively, be used to alert another system or user of the threshold condition's satisfaction, to effectuate a respective adjustment, e.g., a manual or automatic remedial or mitigating action.

Figure 6A:
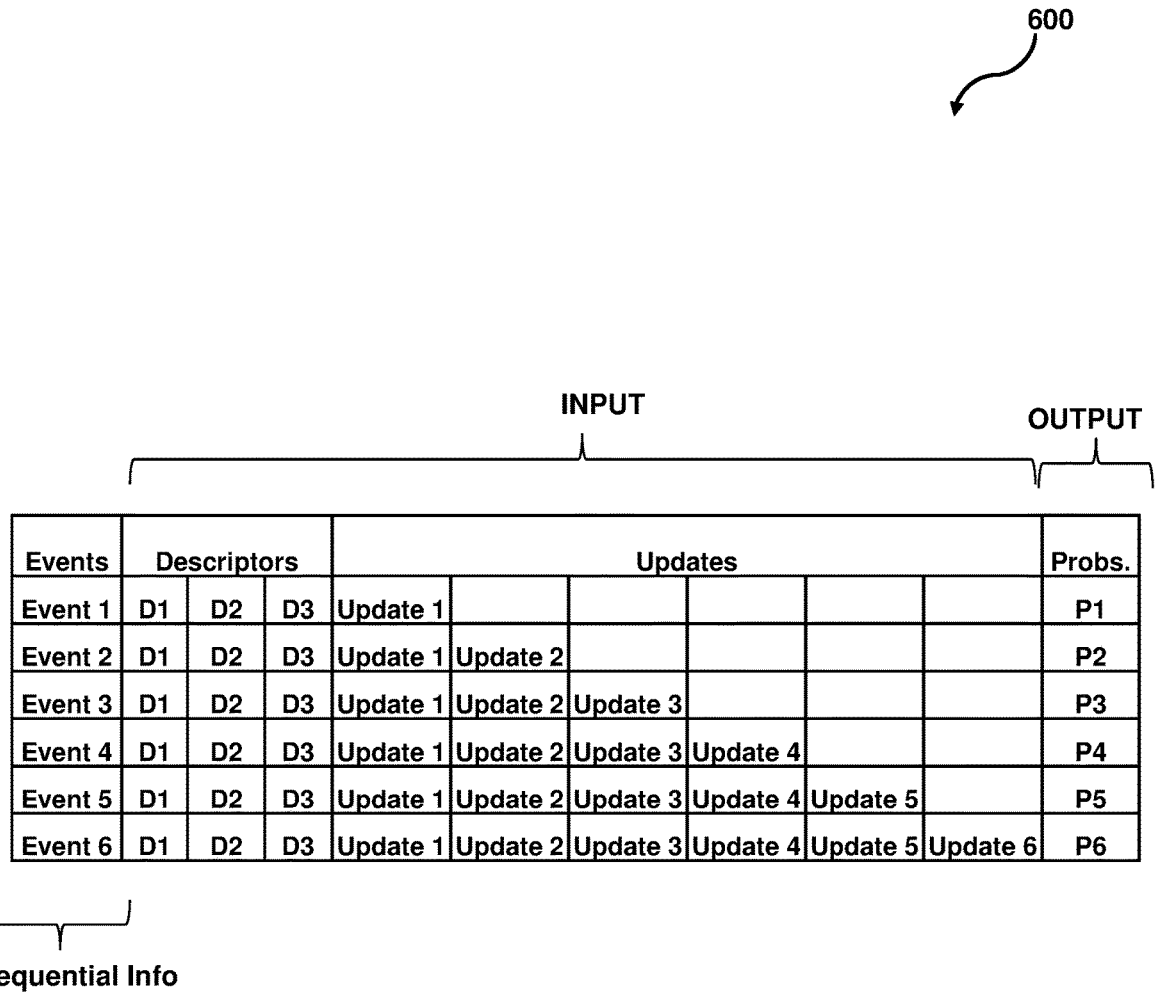
FIG. 6A is a diagram that illustrates example real-time input data and output data, in accordance with one or more embodiments.

FIG. 6A is a diagram that illustrates example real-time input data and output data, in accordance with one or more embodiments. As seen from real-time data 600, for a given system, which may be executing a particular process (such as a transaction settlement, hospital readmittance prediction, compliance verification, etc.), each update to the system/process may be associated with a corresponding row of data 600. Data 600 may be organized sequentially based on a time with which each update occurred. For example, the "Events" data field may indicate sequential information regarding when a particular status update occurred. Data 600 may also include inputs, which may include descriptors, e.g., D1, D2, D3, as well as the updates. In some embodiments, each status update may include one or more updates to the system. For example, the first status update may include a first update, Update 1, while the second status update may include the first update and a second update serving as input to the machine learning model. Based on each status update's input data, e.g., the descriptors and updates to the system, a new output may be obtained. The output may be a score indicating a likelihood that the update to the system will result in a particular result. In some embodiments, the score may be a failure/success score indicating a likelihood that a given processes, e.g., a settlement transaction, will be successful at expiry. Some embodiments include a time remaining until expiry also being included as an input to the model.

Figure 6B:
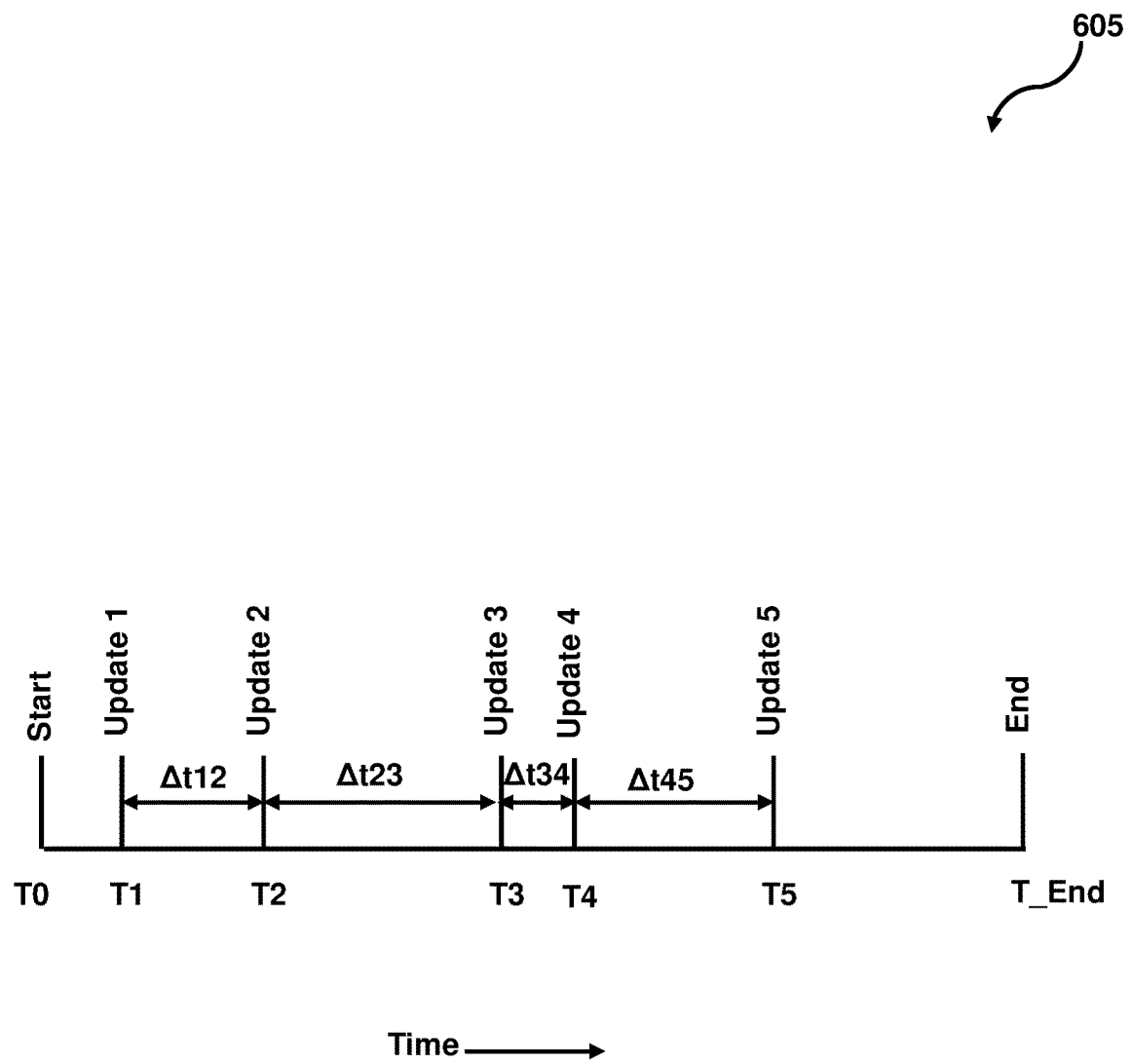
FIG. 6B is a diagram that illustrates an example timeline depicting a timing of system updates, in accordance with one or more embodiments.

FIG. 6B is a diagram that illustrates an example timeline depicting a timing of system updates, in accordance with one or more embodiments. Timeline 605 describes a temporal sequence of status updates to the system performing the process, as described above. Some embodiments include the time between status updates being non-uniform. For example, the time between the first status update at time T1 and the second status update at time T2 may be equal to $\Delta t12$, the time between the second status update at time T2 and the third status update at time T3 may be equal to $\Delta t23$, the time between the third status update at time T3 and the fourth status update at time T4 may be equal to $\Delta t34$, and the time between the fourth status update at time T4 and the fifth status update at time T5 may be equal to $\Delta t45$. Some embodiments include $\Delta t12$, $\Delta t23$, $\Delta t34$, $\Delta t45$ being equal, however one or more of $\Delta t12$, $\Delta t23$, $\Delta t34$, $\Delta t45$ may differ.

Figure 7:
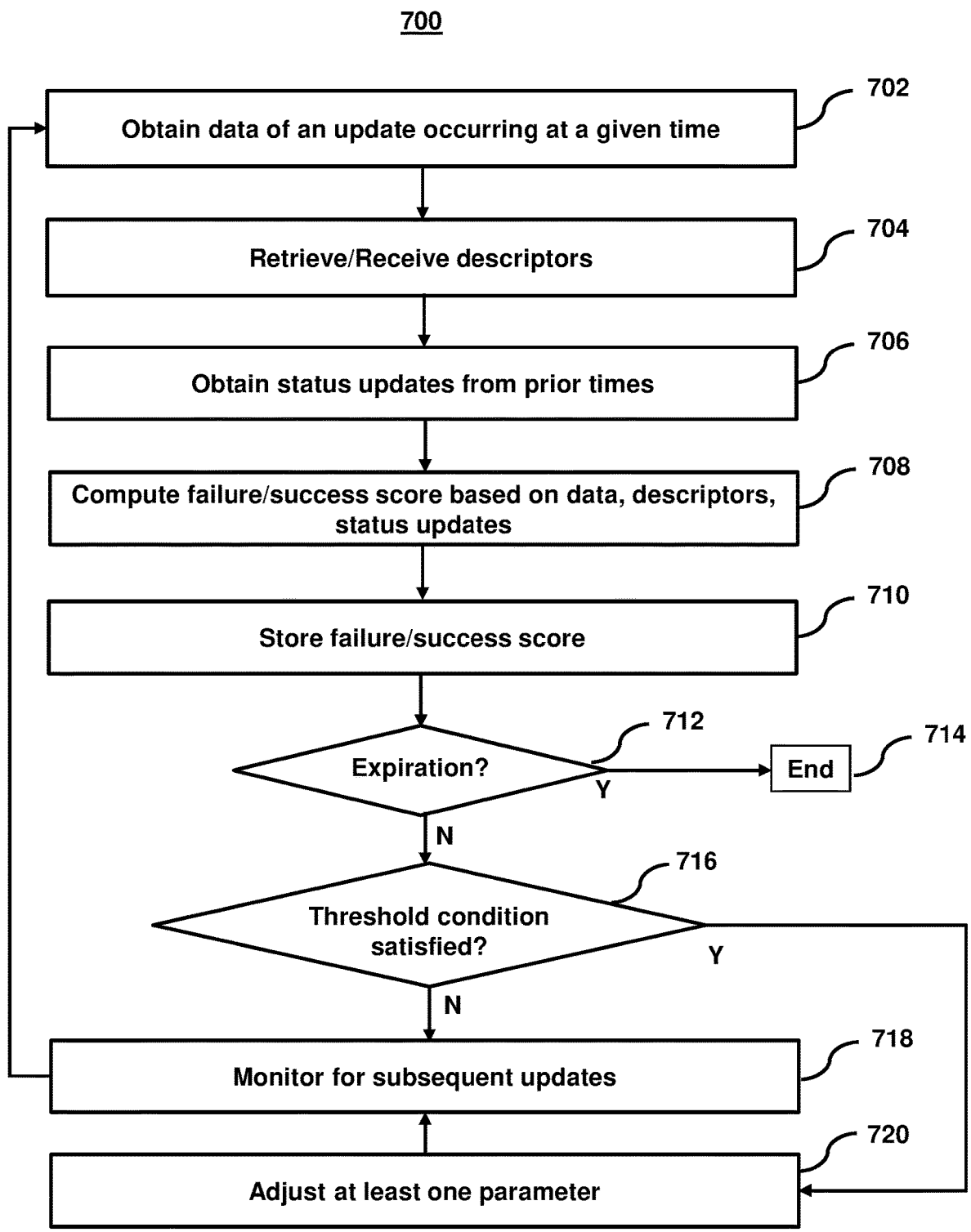
FIG. 7 is a flowchart that describes an example process for performing real-time updates to a likelihood determination, in accordance with one or more embodiments.

FIG. 7 is a flowchart that describes an example process 700 for performing real-time updates to a likelihood determination, in accordance with one or more embodiments. In some embodiments, process 700 may begin at operation 702. At operation 702, data of an update occurring at a given time may be obtained. For example, an update to a system (or a process performed by the system) may be obtained. In operation 704, descriptors may be retrieved/received. For example, descriptors describing fixed information about the system (or process performed by the system) may be obtained from descriptor database 136. In operation 706, status updates from prior times may be obtained. For example, with reference to FIG. 6A, at the fourth status update, each update to the system (or process performed by the system) previously obtained may be obtained, e.g., first thru third status updates. In operation 708, a failure/success score (or other performance metric indicating the likelihood that a particular outcome will occur at an expiration time of a process performed by a system) may be computed based on the obtained data, the retrieved/received descriptors, and the obtained prior status updates. In operation 710, the failure/success score (or other performance metric) may be stored, e.g., in results database 516. In operation 712, a determination may be made as to whether the expiration time has been reached. The expiration time refers to a predefined time when a particular process (the process with which the trained machine learning model is configured to predict the likelihood of) ends. For example, a transaction settlement process may have an expiration time when a determination is made as to whether the settlement has occurred.

If, at operation 712, it is determined that the expiration time has been reached, process 700 may proceed to operation 714 whereby process 700 may conclude. If, however, at operation 712, it is determined that the expiration time has not been reached, process 700 may proceed to operation 716. In operation 716, a determination may be made as to whether a threshold condition has been satisfied. For example, a determination may be made as to whether the failure/success score is less than a threshold failure/success score. If, at operation 716, it is determined that the threshold condition has been satisfied, then process 700 may proceed to operation 720. In operation 720, one or more parameters associated with the system (or process performed thereby) may be adjusted. If, however, it is determined that, in operation 716, the threshold condition has not been satisfied, process 700 may proceed to operation 718. In operation 718, the system may continue to be monitored for new updates that are subsequently received (if any at all). After operation 718, process 700 may return to operation 702, where new data may be subsequently received.

Figure 8:
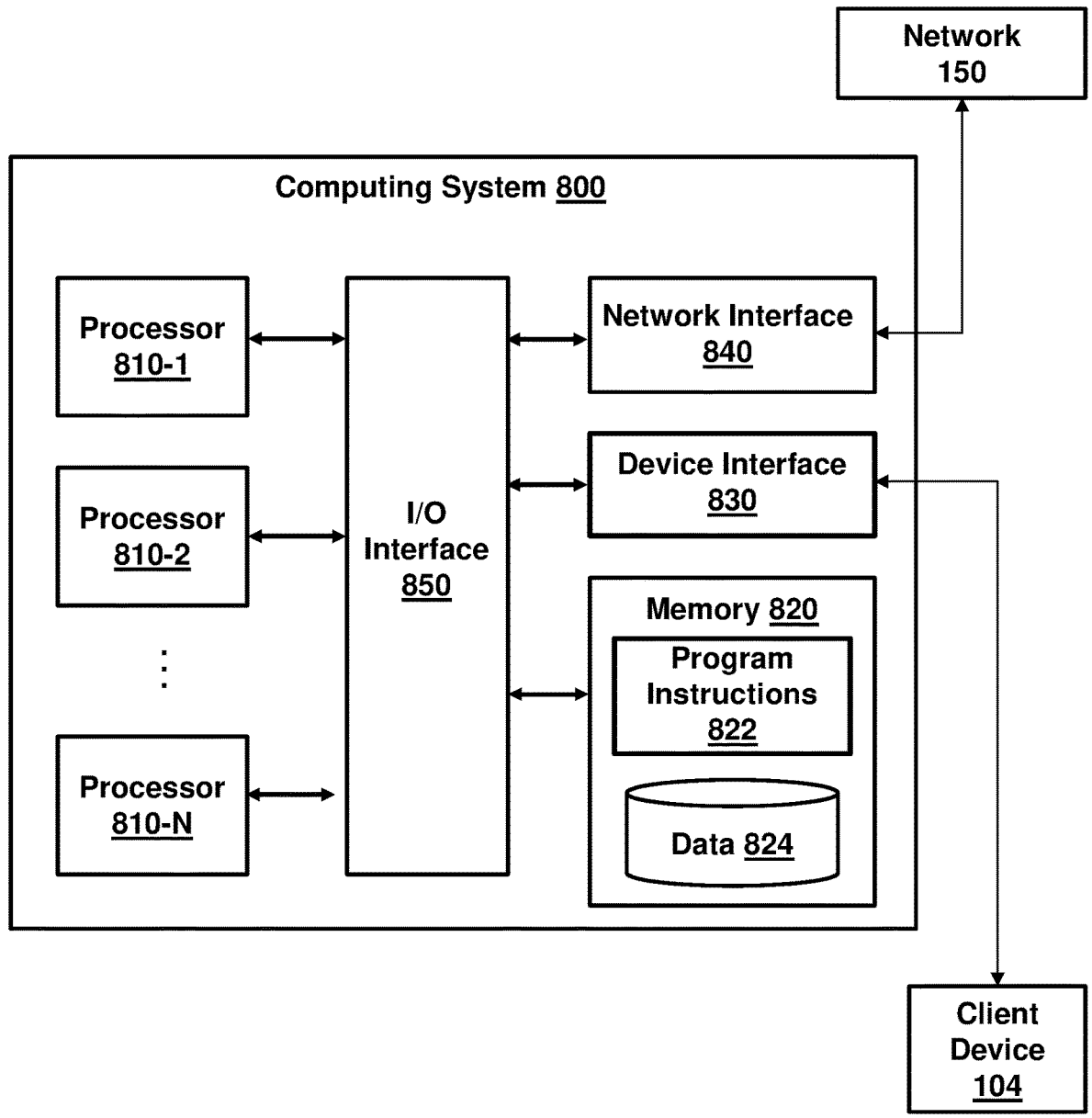
FIG. 8 illustrates an example computing system with which one or more embodiments may be implemented.

FIG. 8 is a diagram that illustrates an exemplary computing system 800 in accordance with embodiments of the present technique. Various portions of systems and methods described herein, may include or be executed on one or more computing systems similar to computing system 800. Further, processes and modules described herein may be executed by one or more processing systems similar to that of computing system 800. For example, computing system 102 may execute operations using a processing system that is the same or similar to computing system 800.

Computing system 800 may include one or more processors (e.g., processors 810-1-810-N) coupled to system memory 820, an input/output I/O device interface 830, and a network interface 840 via an input/output (I/O) interface 850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 820). Computing system 800 may be a uni-processor system including one processor (e.g., processor 810-1), or a multi-processor system including any number of suitable processors (e.g., 810-1-810-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 800 may include a plurality of computing devices (e.g., distributed computing systems) to implement various processing functions.

I/O device interface 830 may provide an interface for connection of one or more I/O devices to computing system 800. I/O devices may include devices that receive input (e.g., from a user) or output information (e.g., to a user), such as client devices 104. I/O devices may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computing system 800 through a wired or wireless connection. I/O devices may be connected to computing system 800 from a remote location. I/O devices located on remote computer system, for example, may be connected to computing system 800 via a network, e.g., network(s) 150, and network interface 840.

Network interface 840 may include a network adapter that provides for connection of computing system 800 to a network. Network interface 840 may facilitate data exchange between computing system 800 and other devices connected to the network. Network interface 840 may support wired or wireless communication. The network, such as for example network(s) 150, may include an electronic communication network, such as the Internet, a local area network (LAN), a wide area network (WAN), a cellular communications network, or the like.

System memory 820 may be configured to store program instructions 822 or data 824. Program instructions 822 may be executable by a processor (e.g., one or more of processors 810-1-810-N) to implement one or more embodiments of the present techniques. Program instructions 822 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 820 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 820 may include a non-transitory computer readable storage medium that may have program instructions stored thereon that are executable by a computer processor (e.g., one or more of processors 810-1-810-N) to cause the subject matter and the functional operations described herein. A memory (e.g., system memory 820) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 850 may be configured to coordinate I/O traffic between processors 810-1-810-N, system memory 820, network interface 840, I/O devices, and/or other peripheral devices. I/O interface 850 may perform protocol, timing, or other data transformations to convert data signals from one component (e.g., system memory 820) into a format suitable for use by another component (e.g., processors 810-1-810-N). I/O interface 850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 800 or multiple computing systems 800 configured to host different portions or instances of embodiments. Multiple computing systems 800 may provide for parallel or sequential processing/execution of one or more portions of the techniques described herein.

Those skilled in the art will appreciate that computing system 800 is merely illustrative and is not intended to limit the scope of the techniques described herein. Computing system 800 may include any combination of devices or software that may perform or otherwise provide for the performance of the techniques described herein. For example, computing system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 800 may be transmitted to computing system 800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square," "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish, or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method comprising: obtaining first data comprising a first update to a first system, the first update occurring at a first time, wherein updates to the first system are permitted until an expiration time; at least one of retrieving or receiving a set of fixed descriptors of the first system; obtaining a set of one or more status updates describing the first system at one or more times prior to the first time, wherein each status update of the set of one or more status updates includes at least (i) an update to the first system and (ii) a time that the respective status update occurred; computing, based on the first data, the set of fixed descriptors, and the set of one or more status updates, using a trained machine learning model, a first failure/success score indicating a likelihood that, at the expiration time, the first system satisfies a threshold condition; and storing the first failure/success score in memory in association with the first data, the set of fixed descriptors, and the set of one or more status updates.
2. The method of embodiment 1, further comprising: determining that the first failure/success score does not satisfy the threshold condition; adjusting one or more parameters of the first system based on the first failure/success score not satisfying the threshold condition; obtaining second data comprising a second update to the first system having the one or more adjusted parameters, the second update occurring at a second time subsequent to the first time; computing, based on the second data, the first data, the set of fixed descriptors, and the set of one or more status updates, using the trained machine learning model, a second failure/success score indicating a likelihood that, at the expiration time, the first system satisfies the threshold condition; and determining that the second failure/success score satisfies the threshold condition.
3. The method of any one of embodiments 1-2, further comprising: determining that the first failure/success score satisfies the threshold condition; and storing a flag indicating that the first failure/success score satisfied the threshold condition in association with the first data, the set of fixed descriptors, and the set of status updates.
4. The method of any one of embodiments 1-3, further comprising: generating a graphical user interface (GUI) for rendering on a client device, the GUI comprising the first failure/success score being displayed with failure/success scores associated with each status update of the set of status updates in temporal order.
5. The method of any one of embodiments 1-4, further comprising: steps for training a machine learning model to obtain the trained machine learning model.
6. The method of any one of embodiments 1-5, further comprising: selecting the trained machine learning model from a model database storing trained machine learning models, wherein the trained machine learning model comprises a trained extreme random tree model.

7. The method of embodiment 6, further comprising: retrieving historical failure/success data of a set of systems from a training data database, wherein the historical failure/success data comprises, for each system of the set of systems, a respective set of fixed descriptors and a respective set of one or more status updates, wherein the respective set of one or more status updates includes an indication of an update to a respective system of the set of systems and a timestamp associated with the update; and training an extreme random tree model using the historical failure/success data to obtain the trained extreme random tree model.

8. The method of embodiment 7, further comprising: generating the historical failure/success data, wherein generating the historical failure/success data comprises, for each system of the set of systems: obtaining a respective set of one or more status updates associated with a respective system from inception to expiration, wherein each of the one or more status updates occurs at a discrete time from inception to expiration and includes at least a type of update and data associated with the respective status update; populating data fields of a first data structure based on the one or more status updates such that the first data structure defines a temporal order with which the one or more status updates occur, and for the discrete time of each of the one or more status updates, the first data structure stores a data record, the data record populating a respective set of the data fields with values including the discrete time, the set of fixed descriptors of the respective system, and the data associated with the respective status update and any status updates that occurred previously for the respective system; and transforming the first data structure into a second data structure comprising data records respectively associated with each system of the set of systems, wherein the second data structure organizes the data records in accordance with the set of systems.

9. The method of any one of embodiments 1-8, wherein a given status update occurs at a non-uniform time interval to a prior given status update.

10. The method of any one of embodiments 1-9, wherein obtaining the first data comprises: selecting a data source from which to obtain the first data, wherein the data source is selected from a plurality of data sources comprising at least one real-time data source; and streaming the first data from the data source.

11. A system comprising memory storing computer program instructions and one or more processors configured to execute the computer program instructions to effectuate the method of any one of embodiments 1-10.

12. A non-transitory computer-readable medium storing computer program instructions that, when executed by one or more processors, effectuate operations comprising the method of any one of embodiments 1-10.

What is claimed is:

1. A method for facilitating real-time determination of a process completion likelihood, implemented on one or more processors configured to execute computer program instructions stored in memory, the method comprising:
   obtaining first data comprising a first update to a first system, the first update occurring at a first time, wherein updates to the first system are permitted until an expiration time;
   at least one of retrieving or receiving a set of fixed descriptors of the first system;
   obtaining a set of one or more status updates describing the first system at one or more times prior to the first time, wherein each status update of the set of one or more status updates includes at least (i) an update to the first system and (ii) a time that the respective status update occurred;
   selecting a trained machine learning model from a model database storing trained machine learning models, wherein the trained machine learning model comprises an extreme random tree model;
   retrieving historical failure/success data of a set of systems from a training data database, wherein the historical failure/success data comprises, for each system of the set of systems, a respective set of fixed descriptors and a respective set of one or more status updates, wherein the respective set of one or more status updates includes an indication of an update to a respective system of the set of systems and a timestamp associated with the update;
   training the extreme random tree model using at least a portion of the historical failure/success data to obtain a trained extreme random tree model;
   computing, based on the first data, the set of fixed descriptors, and the set of one or more status updates, using the trained machine learning model, a first failure/success score indicating a likelihood that, at the expiration time, the first system satisfies a threshold condition;
   storing the first failure/success score in memory in association with the first data, the set of fixed descriptors, and the set of one or more status updates; and
   generating a notification based at least in part on the first failure/success score.

2. The method of claim 1, further comprising:
   determining that the first failure/success score does not satisfy the threshold condition;
   adjusting one or more parameters of the first system based on the first failure/success score not satisfying the threshold condition;
   obtaining second data comprising a second update to the first system having the one or more adjusted parameters, the second update occurring at a second time subsequent to the first time;
   computing, based on the second data, the first data, the set of fixed descriptors, and the set of one or more status updates, using the trained machine learning model, a second failure/success score indicating a likelihood that, at the expiration time, the first system satisfies the threshold condition; and
   determining that the second failure/success score satisfies the threshold condition.

3. The method of claim 1, further comprising:
   determining that the first failure/success score satisfies the threshold condition; and
   storing a flag indicating that the first failure/success score satisfied the threshold condition in association with the first data, the set of fixed descriptors, and the set of one or more status updates.

4. The method of claim 1, further comprising:
   generating a graphical user interface (GUI) for rendering on a client device, the GUI comprising the first failure/success score being displayed with failure/success scores associated with each status update of the set of one or more status updates in temporal order.

5. The method of claim 1, further comprising:
generating the historical failure/success data, wherein generating the historical failure/success data comprises, for each system of the set of systems:
obtaining a respective set of one or more status updates associated with a respective system from inception to expiration, wherein each of the set of one or more status updates occurs at a discrete time from inception to expiration and includes at least a type of update and data associated with the respective status update;
populating data fields of a first data structure based on the set of one or more status updates such that the first data structure defines a temporal order with which the set of one or more status updates occur, and for the discrete time of each of the set of one or more status updates, the first data structure stores a data record, the data record populating a respective set of the data fields with values including the discrete time, the set of fixed descriptors of the respective system, and the data associated with the respective status update and any status updates that occurred previously for the respective system; and
transforming the first data structure into a second data structure comprising data records respectively associated with each system of the set of systems, wherein the second data structure organizes the data records in accordance with the set of systems.

6. The method of claim 1, wherein a given status update occurs at a non-uniform time interval to a prior given status update.

7. The method of claim 1, wherein obtaining the first data comprises:
selecting a data source from which to obtain the first data, wherein the data source is selected from a plurality of data sources comprising at least one real-time data source; and
streaming the first data from the data source.

8. A non-transitory computer-readable medium storing computer program instructions that, when executed by one or more processors, effectuate operations comprising:
obtaining first data comprising a first update to a first system, the first update occurring at a first time, wherein updates to the first system are permitted until an expiration time;
at least one of retrieving or receiving a set of fixed descriptors of the first system;
obtaining a set of one or more status updates describing the first system at one or more times prior to the first time, wherein each status update of the set of one or more status updates includes at least (i) an update to the first system and (ii) a time that the respective status update occurred;
selecting a trained machine learning model from a model database storing trained machine learning models, wherein the trained machine learning model comprises an extreme random tree model;
retrieving historical failure/success data of a set of systems from a training data database, wherein the historical failure/success data comprises, for each system of the set of systems, a respective set of fixed descriptors and a respective set of one or more status updates, wherein the respective set of one or more status updates includes an indication of an update to a respective system of the set of systems and a timestamp associated with the update;
training the extreme random tree model using at least a portion of the historical failure/success data to obtain a trained extreme random tree model;
computing, based on the first data, the set of fixed descriptors, and the set of one or more status updates, using the trained machine learning model, a first failure/success score indicating a likelihood that, at the expiration time, the first system satisfies a threshold condition;
storing the first failure/success score in memory in association with the first data, the set of fixed descriptors, and the set of one or more status updates and
generating a notification based at least in part on the first failure/success score.

9. The non-transitory computer-readable medium of claim 8, wherein the operations further comprise:
determining that the first failure/success score does not satisfy the threshold condition;
adjusting one or more parameters of the first system based on the first failure/success score not satisfying the threshold condition;
obtaining second data comprising a second update to the first system having the one or more adjusted parameters, the second update occurring at a second time subsequent to the first time;
computing, based on the second data, the first data, the set of fixed descriptors, and the set of one or more status updates, using the trained machine learning model, a second failure/success score indicating a likelihood that, at the expiration time, the first system satisfies the threshold condition; and
determining that the second failure/success score satisfies the threshold condition.

10. The non-transitory computer-readable medium of claim 8, wherein the operations further comprise:
determining that the first failure/success score satisfies the threshold condition; and
storing a flag indicating that the first failure/success score satisfied the threshold condition in association with the first data, the set of fixed descriptors, and the set of one or more status updates.

11. The non-transitory computer-readable medium of claim 8, wherein the operations further comprise:
generating a graphical user interface (GUI) for rendering on a client device, the GUI comprising the first failure/success score being displayed with failure/success scores associated with each status update of the set of one or more status updates in temporal order.

12. The non-transitory computer-readable medium of claim 8, wherein the operations further comprise:
generating the historical failure/success data, wherein generating the historical failure/success data comprises, for each system of the set of systems:
obtaining a respective set of one or more status updates associated with a respective system from inception to expiration, wherein each of the set of one or more status updates occurs at a discrete time from inception to expiration and includes at least a type of update and data associated with the respective status update;
populating data fields of a first data structure based on the set of one or more status updates such that the first data structure defines a temporal order with which the set of one or more status updates occur, and for the discrete time of each of the set of one or more status updates, the first data structure stores a data record, the data record populating a respective set of the data fields with values including the discrete time, the set of fixed descriptors of the respective system, and the data associated with the respective status update and any status updates that occurred previously for the respective system; and
transforming the first data structure into a second data structure comprising data records respectively associated with each system of the set of systems, wherein the second data structure organizes the data records in accordance with the set of systems.

13. The non-transitory computer-readable medium of claim 8, wherein the operations further comprise, wherein a given status update occurs at a non-uniform time interval to a prior given status update.

14. The non-transitory computer-readable medium of claim 8, wherein obtaining the first data comprises:
selecting a data source from which to obtain the first data, wherein the data source is selected from a plurality of data sources comprising at least one real-time data source; and
streaming the first data from the data source.

15. A computing system for facilitating real-time determination of a process completion likelihood, the computing system comprising:
memory storing computer program instructions; and
one or more processors configured to execute the computer program instructions to cause the one or more processors to:
obtain first data comprising a first update to a first system, the first update occurring at a first time, wherein updates to the first system are permitted until an expiration time;
at least one of retrieve and receive a set of fixed descriptors of the first system;
obtain a set of one or more status updates describing the first system at one or more times prior to the first time, wherein each status update of the set of one or more status updates includes at least (i) an update to the first system and (ii) a time that the respective status update occurred;
select the trained machine learning model from a model database storing trained machine learning models, wherein the trained machine learning model comprises an extreme random tree model;
retrieve historical failure/success data of a set of systems from a training data database, wherein the historical failure/success data comprises, for each system of the set of systems, a respective set of fixed descriptors and a respective set of one or more status updates,
wherein the respective set of one or more status updates includes an indication of an update to a respective system of the set of systems and a timestamp associated with the update; and
train the extreme random tree model using at least a portion of the historical failure/success data to obtain a trained extreme random tree model;
compute, based on the first data, the set of fixed descriptors, and the set of one or more status updates, using the trained machine learning model, a first failure/success score indicating a likelihood that, at the expiration time, the first system satisfies a threshold condition;
store the first failure/success score in memory in association with the first data, the set of fixed descriptors, and the set of one or more status updates and generate a notification based at least in part on the first failure/success score.

16. The computing system of claim 15, wherein the computer program instructions further cause the one or more processors to:
determine that the first failure/success score does not satisfy the threshold condition;
adjust one or more parameters of the first system based on the first failure/success score not satisfying the threshold condition;
obtain second data comprising a second update to the first system having the one or more adjusted parameters, the second update occurring at a second time subsequent to the first time;
compute, based on the second data, the first data, the set of fixed descriptors, and the set of one or more status updates, using the trained machine learning model, a second failure/success score indicating a likelihood that, at the expiration time, the first system satisfies the threshold condition; and
determine that the second failure/success score satisfies the threshold condition.

17. The computing system of claim 15, wherein the computer program instructions further cause the one or more processors to:
determine that the first failure/success score satisfies the threshold condition; and
store a flag indicating that the first failure/success score satisfied the threshold condition in association with the first data, the set of fixed descriptors, and the set of one or more status updates.

18. The computing system of claim 15, wherein the computer program instructions further cause the one or more processors to:
generate a graphical user interface (GUI) for rendering on a client device, the GUI comprising the first failure/success score being displayed with failure/success scores associated with each status update of the set of one or more status updates in temporal order.

19. The computing system of claim 15, wherein the computer program instructions further cause the one or more processors to:
generate the historical failure/success data, wherein the historical failure/success data being generated comprises, for each system of the set of systems:
obtaining a respective set of one or more status updates associated with a respective system from inception to expiration, wherein each of the set of one or more status updates occurs at a discrete time from inception to expiration and includes at least a type of update and data associated with the respective status update;
populating data fields of a first data structure based on the set of one or more status updates such that the first data structure defines a temporal order with which the set of one or more status updates occur, and for the discrete time of each of the set of one or more status updates, the first data structure stores a data record, the data record populating a respective set of the data fields with values including the discrete time, the set of fixed descriptors of the respective system, and the data associated with the respective status update and any status updates that occurred previously for the respective system; and
transforming the first data structure into a second data structure comprising data records respectively associated with each system of the set of systems, wherein the second data structure organizes the data records in accordance with the set of systems.

20. The computing system of claim 15, wherein a given status update occurs at a non-uniform time interval to a prior given status update.

21. The computing system of claim 15, wherein the first data being obtained comprises the computer program instructions causing the one or more processors to:
   select a data source from which to obtain the first data, wherein the data source is selected from a plurality of data sources comprising at least one real-time data source; and
   stream the first data from the data source.

* * * * *